March 18, 1947. L. FRANK 2,417,681
RIVET HOLE LOCATOR AND GAUGE
Filed Aug. 4, 1943
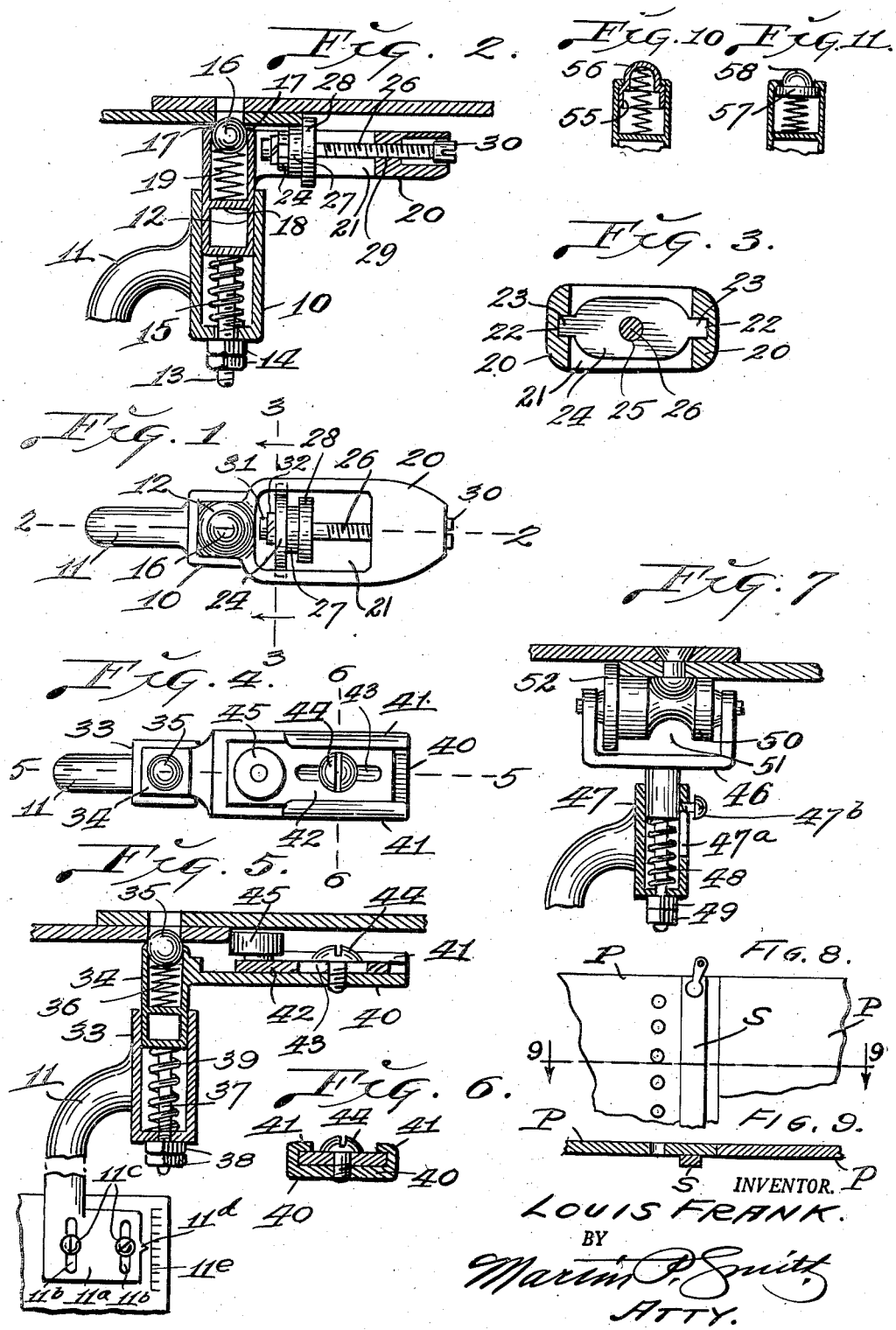
INVENTOR.
LOUIS FRANK.
BY
Marion P. Smith
ATTY.

Patented Mar. 18, 1947

2,417,681

UNITED STATES PATENT OFFICE 2,417,681

RIVET HOLE LOCATOR AND GAUGE

Louis Frank, Fellows, Calif.

Application August 4, 1943, Serial No. 497,332

6 Claims. (Cl. 78—46)

My invention relates to a rivet hole locator and gauge and has for its principal object to provide a relatively simple, practical and inexpensive device especially designed for use in connection with rivet driving and setting appliances, and the principal object of my invention is to provide a simple, practical and inexpensive device which in operation will be effective in positioning a rivet setting and driving tool so that rivets therefrom may be readily inserted into the rivet holes before being engaged by the rivet setting tool and dolly.

Further objects of my invention are to provide a rivet hole locator and gauge of the character referred to which is readily adjustable to work wherein the rows of rivet holes are located at different distances from the edge of the plate, and further, to provide a device which will be of material assistance in speeding up the work incident to the feeding and location of the rivets into the registering apertures in the work and the subsequent driving and setting of said rivets. My invention with minor changes may be used for positioning screws in holes prepared for them.

With the foregoing and other objects in view, my invention consists in certain novel features of construction and arrangement of parts which will be hereinafter more fully described and claimed and illustrated in the accompanying drawings in which:

Fig. 1 is a plan view of a rivet hole locator and gauge.

Fig. 2 is a vertical section taken on the line 2—2 of Fig. 1.

Fig. 3 is an enlarged cross section taken on the line 3—3 of Fig. 1.

Fig. 4 is a plan view of a modified form of the rivet hole locator and gauge.

Fig. 5 is a vertical section taken on the line 5—5 of Fig. 4.

Fig. 6 is a cross section taken on the line 6—6 of Fig. 4.

Fig. 7 is an elevational view partly in section of a further modified form of the locator and gauge.

Fig. 8 is a fragmentary view of portions of a pair of abutting plates which are riveted to a beam or the like and with a guide strip applied to one of said sheets.

Fig. 9 is a cross section taken on the line 9—9 of Fig. 8.

Figs. 10 and 11 are detail sectional views of modified forms of the spring pressed rivet holding engaging members.

Referring by numerals to the accompanying drawings and particularly to the construction illustrated in Figs. 1 to 3 inclusive, 10 designates a housing preferably tubular in form, square or non-circular in cross section and closed at its lower end. This housing is suitably connected, preferably by means of a bracket 11, to a conventional riveting tool or tool utilized for inserting rivets in their holes.

Arranged for sliding movement in the upper portion of housing 10 is a plunger 12, square or non-circular in cross section and projecting from the lower end thereof downwardly through an opening in the closed lower end of said housing 10 is a guide stem 13, the lower portion of which is threaded for the reception of nuts 14 which normally bears against the lower end of the housing and limits the upward movement of the plunger 12 therein.

Mounted on stem 13 between the lower end of plunger 12 and the lower end of housing 10 is an expansive coil spring 15. Arranged to slide freely in the upper end portion of plunger 12 is a ball 16, preferably of hardened metal, and which is retained within said plunger by an annular lip 17 which is formed on said plunger around its upper end.

Positioned between ball 16 and a partition 18 in plunger 12 is an expansive coil spring 19 of light tension. Formed integral with the upper portion of plunger 12 and projecting at right angles therefrom is an arm 20 in the central portion of which is formed an opening 21. Formed in the inner faces of the walls to the side of the opening 21 are longitudinally disposed grooves 22 and arranged for sliding movement therein are lugs 23 which project from the ends of a transversely disposed plate 24. An aperture 25 in the center of plate 24 provides a bearing for the inner portion of a shaft 26 and loosely mounted upon said shaft adjacent plate 24 is a wheel 27 provided on its end opposite plate 24 with a flange 28. This wheel 27 is adapted to ride on the exposed face on one of the sheets or plates that are being riveted with flange 28 bearing against the edge of said plate as illustrated in Fig. 2, thus maintaining the plunger carrying ball 16 so that it will be successively engaged in the rivet holes as the rivet inserting and setting tools are used.

That portion of shaft 26 outwardly from the flanged wheel 27 is threaded for engagement in a threaded bore 29, the latter being formed through the outer portion of arm 20 and the end of said shaft terminating in a head 30 having a slot for the reception of the point of a screw driver utilized in adjusting the shaft lengthwise in the arm 20. The inner end of shaft 26 terminates in a head 31 and a split washer 32 is located between said head and bearing plate 24.

In the use of the form of rivet hole locator and gauge just described, the sheets or plates to be riveted are brought together and temporarily secured with the rivet holes in registration and to guide and gauge the rivet inserting and driving means, my improved gauge is positioned so that the ball 16 enters one of the rivet holes with the flange 28 bearing against the edge of the sheet and when so positioned, the rivet inserting tool or driving tool will be in proper position to insert a rivet in the next adjacent hole or to drive and set a rivet after it has been inserted.

Shaft 26 carrying the flanged roller 27 may be moved lengthwise in the arm 20 so as to correspond with the distance between the edge of the sheet and the line occupied by the centers of the rivet holes therein, and thus, as the tool is moved along the edge of the sheet, the ball 16 will, under the influence of expansive spring 19, snap into the spaced rivet holes and when so positioned, the rivet inserting tool or riveting tool in advance of or behind the combined locator and gauge may be manipulated, thus greatly facilitating and expediting the work incident to the rivet inserting and setting operations.

By means of nut 14 on threaded stem 13, the ball carrying plunger 12 may be readily adjusted in housing 10 so as to properly position the outer end of the plunger 12 and the ball carried thereby relative to the periphery of the sheet engaging roller 27.

The modified construction illustrated in Figs. 4, 5 and 6 includes a housing 33 which is suitably attached to a rivet inserting or rivet setting tool, and arranged for sliding movement in said housing, is a plunger 34 in the outer end of which is arranged for sliding movement a ball 35. An expansive spring 36 within the plunger bears against the underside of ball 35 and a stem 37 extends from the lower end of the plunger 34 downwardly through the bottom of said housing, and mounted on the threaded lower portion of said stem are adjusting nuts 38.

An expansive spring 39 is positioned upon stem 37 between plunger 34 and the lower end of housing 33. Projecting at right angles from the upper portion of the plunger 34 is an arm 40, and arranged for adjustment thereupon between inverted L-shaped ribs 41 on the edge of said arm is a plate 42. Formed in plate 42 is a longitudinally disposed slot 43 and extending therethrough is a clamping screw 44, the lower end of which is screw seated in the arm. Thus, plate 42 may be adjusted toward and away from the ball carrying plunger 34 and locked by the clamping screw 44 after such adjustment.

Mounted for rotation on the inner portion of plate 42 is a roller 45 which is adapted to ride on the edge of one of the plates or bars which are being connected by rivets.

In the use of this form of hole locator and gauge, the tool is moved along the edge of one of the plates or bars being riveted with the roller 45 bearing against the edge of one of said plates or bars and during such movement, the ball 15 under pressure exerted by spring 36 will successively snap into the rivet holes in the plates or bars, thus positioning the rivet inserting tool or driving tool in proper position to insert a rivet in the next adjacent hole or to drive and set a rivet which has been inserted.

Plate 42 carrying roller 45 may be readily adjusted lengthwise upon the arm 40 so as to enable roller 45 to bear on the edge of one of the plates or bars and gauge the distance between said edge and a line passing through the centers of the rivet holes.

In order that my improved hole locator and gauge may be used on plates having abutting edges and which plates are to be riveted to a beam or the like, the plates P are assembled as illustrated in Figs. 8 and 9 and a strip S, preferably of metal, is temporarily secured to one of the plates by means of clamps or otherwise, with one edge of said strip located a predetermined distance from the row of rivet holes in said plate.

Thus, the edge of the strip provides a bearing and rail for the wheel or roller of the locator and gauge while the same is being used to guide and position the rivet inserter or driver.

In order that the hole locator and gauge may be properly positioned upon the rivet driving and setting tools with which it is associated, the arm 11 which connects the locator and gauge may be provided with a plate 11a having parallel slots 11b for the reception of set screws 11c and one edge of said plate carries a pointer 11d which cooperates with a graduated scale 11e on that part of the riveting tool with which the gauge is associated, thus, the spring pressed ball such as 16 or 35 of the gauge and the roller, such as 27 or 45, may be adjusted to correspond with the plane occupied by the end of the rivet driving, setting tool and its dolly.

The construction illustrated in Fig. 7 is particularly adapted for use in connection with rivet driving and setting tools, and this construction comprises a yoke 46 mounted for sliding movement in a tubular housing 47 which is connected to the riveting tool, and located within the housing below the stem of the yoke is an expansive spring 48 which tends to force said yoke outwardly and such outward movement being limited by a nut or nuts 49 positioned on the threaded end of the stem below the housing.

In order to hold the stem of the yoke 46 from rotating in housing 47 a longitudinally disposed slot 47a is formed in said housing, and passing through said slot and seated in the stem of the yoke is a pin or screw 47b (see Fig. 7).

Journalled in yoke 46 is a roller 50 provided with a circumferential groove 51 for the accommodation of the heads of the rivets seated in plates, bars or the like, and formed on one end of said roller is a flange 52 which bears on the edge of the plate upon which the roller rides, and thus, the rivet driving and setting tool associated with the gauge is correctly positioned for driving and setting rivets which have been inserted in the holes directly in front of the gauge.

In Fig. 10, I have shown a modified form of the spring pressed rivet hole engaging member, the same being in the form of a hollow spring pressed stud 55 having a rounded outer end 56 which is adapted to enter rivet holes.

In Fig 11, a spring pressed plunger 57 is provided with a rounded outer portion 58 which is adapted to engage in rivet holes.

Thus, it will be seen that I have provided a rivet hole locator and gauge which is simple in construction, inexpensive of manufacture and very effective in performing the functions for which it is intended. It will be understood that minor changes in the size, form and construction of the various parts of my improved rivet hole locator and gauge may be made and substituted for those herein shown and described without de-

I claim as my invention:

1. In a rivet hole locator and gauge, a support, a spring pressed plunger mounted for sliding movement in said support, a spring pressed ball mounted for sliding movement in said plunger, an arm projecting from said plunger and a work engaging roller journalled for rotation upon said arm.

2. A rivet hole locator and gauge as set forth in claim 1 and with means for adjusting said roller toward and away from said plunger.

3. A rivet hole locator and gauge as set forth in claim 1 with means for adjusting the position of said plunger in said support.

4. In a rivet hole locator and gauge, a support, a spring pressed plunger arranged for sliding movement in said support, a spring pressed ball arranged for sliding movement in said plunger, an arm projecting from said plunger, a work engaging roller journalled for operation in said arm, and a work engaging flange on one end of said roller.

5. A rivet hole locator and gauge as set forth in claim 4 and with means for adjusting said roller toward and away from said plunger.

6. In a rivet hole locator and gauge, a support, a spring pressed member mounted for sliding movement on said support, a spring pressed ball carried by said spring pressed member which ball is adapted to enter rivet holes in the work upon which the gauge is used, and a work engaging roller adjustably mounted on said spring pressed member.

LOUIS FRANK.

REFERENCES CITED

The following references are of record in the file of this patent:

UNITED STATES PATENTS

| Number | Name | Date |
| --- | --- | --- |
| 1,634,521 | Stapp | July 5, 1927 |
| 1,991,138 | Christie | Feb. 12, 1935 |
| 42,375 | Howell et al. | Apr. 19, 1864 |
| 1,375,395 | Krook | Apr. 19, 1921 |